US012679914B2

(12) United States Patent
Herrera Garcia et al.

(10) Patent No.: US 12,679,914 B2

(45) Date of Patent: Jul. 14, 2026

(54) POLYMERIZATION OF DIOL BIS(ALLYL CARBONATES) USING A MIXTURE OF TWO DIFFERENT PEROXY COMPOUNDS

(71) Applicant: PPG Industries Ohio, Inc., Cleveland, OH (US)

(72) Inventors: Marco Antonio Herrera Garcia, Pittsburgh, PA (US); Jeremy J. Hay, Somerset, PA (US); Kevin H. Klingensmith, Gibsonia, PA (US); Robert D. Herold, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 499 days.

(21) Appl. No.: 18/549,185

(22) PCT Filed: Mar. 8, 2022

(86) PCT No.: PCT/US2022/071014

§ 371 (c)(1),
(2) Date: Sep. 6, 2023

(87) PCT Pub. No.: WO2022/192860

PCT Pub. Date: Sep. 15, 2022

(65) Prior Publication Data

US 2024/0158554 A1 May 16, 2024

Related U.S. Application Data

(60) Provisional application No. 63/158,450, filed on Mar. 9, 2021.

(51) Int. Cl.

| | |
|---|---|
| ***C08F 222/10*** | (2006.01) |
| ***C08F 4/38*** | (2006.01) |
| ***G02B 1/04*** | (2006.01) |

(52) U.S. Cl.

CPC .......... *C08F 222/1061* (2020.02); *C08F 4/38* (2013.01); *G02B 1/041* (2013.01)

(58) Field of Classification Search

CPC ...... C08F 222/1061; C08F 4/38; C08F 18/24; C08F 2/001; C08F 2/02; G02B 1/041

See application file for complete search history.

(56) References Cited

U.S. PATENT DOCUMENTS

| | | | | |
|---|---|---|---|---|
| 4,607,087 A * | 8/1986 | Moriya | .................. | C08F 18/24 526/314 |
| 5,739,243 A | 4/1998 | Herold et al. | | |

(Continued)

FOREIGN PATENT DOCUMENTS

| | | |
|---|---|---|
| CN | 110291122 A | 9/2019 |
| EP | 0080338 B1 | 6/1983 |
| WO | 2022/192860 A1 | 9/2022 |

OTHER PUBLICATIONS

International Search Report and Written Opinion received for PCT Application Serial No. PCT/US2022/071014 dated Jun. 30, 2022, 9 pages.

*Primary Examiner* — Alicia Bland

(57) ABSTRACT

Provided is a polymerizable composition including (a) a polymerizable component comprising a diol bis(allyl carbonate) and/or a pre-polymer thereof; and (b) a polymerization initiator component including: (i) a di($C_6$-$C_{10}$ alkyl) peroxydicarbonate, and (ii) an organic peroxide having one peroxy, one peroxycarbonate, or one peroxybenzoate group and a 1,1-dimethylalkyl group bonded to a peroxy oxygen, where (ii) comprises a molecular weight ranging from 200 to 250 g/mole, the polymerization initiator (b) is free of diisopropyl peroxydicarbonate, (i) comprises an amount ranging from 4.87% to 7.90% by weight relative to the total solids of the polymerizable composition and (ii) comprises an amount within the range defined by the following for- (Continued)

mula: $(4.406X^2-0.592X+0.021) \leq Y \leq (0.726X^2-0.121X+0.009)$ where X corresponds to the weight fraction of (i) and Y corresponds to the weight fraction of (ii). Also provided is a method of making an optical article from the polymerizable composition.

17 Claims, 2 Drawing Sheets

(56) References Cited

U.S. PATENT DOCUMENTS

| | | | | |
|---|---|---|---|---|
| 5,952,441 | A | 9/1999 | Herold | |
| 2020/0062924 | A1 * | 2/2020 | Lafarge | C08F 4/34 |
| 2020/0088909 | A1 | 3/2020 | Lertwattanaseri et al. | |
| 2020/0233117 | A1 | 7/2020 | Ogawa et al. | |

* cited by examiner

POLYMERIZATION OF DIOL BIS(ALLYL CARBONATES) USING A MIXTURE OF TWO DIFFERENT PEROXY COMPOUNDS

CROSS-REFERENCE TO RELATED APPLICATION

This application claims priority to U.S. Provisional Application No. 63/158,450, filed on Mar. 9, 2021, the disclosure of which is incorporated by reference in its entirety.

FIELD OF THE INVENTION

The present invention relates to a polymerizable composition that includes a polymerization initiator, where the polymerizable composition is used for preparing a molded polymeric article, such as, a molded optical article.

BACKGROUND OF THE INVENTION

Allyl carbonate monomer compositions can be polymerized for use as transparent coatings, optical lenses, and other optical articles. When used in the lens manufacturing process, the polymerized polymer has stringent technical requirements in terms of optical quality and physical, chemical, and thermomechanical properties.

Polymerization of such allyl carbonate monomer compositions is conventionally accomplished by the inclusion of one or more free-radical initiators, such as, organic peroxy initiators. One of the most commonly used organic peroxy initiators is diisopropyl peroxydicarbonate ("IPP"). However, the transportation and storage of IPP requires low temperature storage due to its low self-accelerating decomposition temperature. In some cases, IPP is produced locally or in a monomer-initiator premix to limit the shipping time and hazard exposure; however, this process can require the transportation of the isopropyl chloroformate "IPCF") precursor, which is also difficult to transport due to the IPCF's high flammability and volatility.

There is a need for a polymerization initiator and/or initiator precursor for allyl carbonate monomer compositions that is safe to transport and store without special handling such as, refrigeration, that has both low flammability and low volatility when stored under ambient conditions, and that produces a polymerized composition having acceptable optical quality and physical, chemical, and thermomechanical properties.

SUMMARY OF THE INVENTION

The present invention is directed to a polymerizable composition including:

(a) a polymerizable component including a diol bis(allyl carbonate) and/or a pre-polymer thereof; and (b) a polymerization initiator component including:

(i) a di($C_6$-$C_{10}$ alkyl) peroxydicarbonate, and (ii) an organic peroxide having one peroxy, one peroxycarbonate, or one peroxybenzoate group and a 1,1-dimethylalkyl group bonded to a peroxy oxygen, wherein the organic peroxide having one peroxy, one peroxycarbonate or one peroxybenzoate group and a 1,1-dimethylalkyl group bonded to the peroxy oxygen (ii) includes a molecular weight ranging from 200 to 250 g/mole, wherein the polymerization initiator (b) is free of diisopropyl peroxydicarbonate, wherein the di($C_6$-$C_{10}$ alkyl) peroxydicarbonate (i) includes an amount ranging from 4.87% to 7.90% by weight relative to the total solids of the polymerizable composition, and wherein the organic peroxide having one peroxy, one peroxycarbonate, or one peroxybenzoate group and a 1,1-dimethylalkyl group bonded to a peroxy oxygen (ii) includes an amount within the range defined by the following formula:

$$(4.406X^2-0.592X+0.021)\leq Y\leq(0.726X^2-0.121X+0.009)$$

wherein X corresponds to the weight fraction of the di($C_6$-$C_{10}$ alkyl) peroxydicarbonate (i) and Y corresponds to the weight fraction of the organic peroxide having one peroxy, one peroxycarbonate, or one peroxybenzoate group and a 1,1-dimethylalkyl group bonded to a peroxy oxygen (ii).

The present invention is also directed to a method of preparing a molded optical article, the method including:

(1) providing a polymerizable composition, wherein preparation of the polymerizable composition includes mixing (a) a polymerizable component comprising a diol bis(allyl carbonate) and/or a pre-polymer thereof with (b) a polymerization initiator component, wherein the polymerization initiator component (b) includes:

(i) a di($C_6$-$C_{10}$ alkyl) peroxydicarbonate, and (ii) an organic peroxide having one peroxy, one peroxycarbonate, or one peroxybenzoate group and a 1,1-dimethylalkyl group bonded to a peroxy oxygen, wherein the organic peroxide having one peroxy, one peroxycarbonate or one peroxybenzoate group and a 1,1-dimethylalkyl group bonded to the peroxy oxygen (ii) includes a molecular weight ranging from 200 to 250 g/mole, wherein the polymerization initiator (b) is free of diisopropyl peroxydicarbonate, wherein the di($C_6$-$C_{10}$ alkyl) peroxydicarbonate (i) includes an amount ranging from 4.87% to 7.90% by weight relative to the total solids of the polymerizable composition, and wherein the organic peroxide having one peroxy, one peroxycarbonate or one peroxybenzoate group and a 1,1-dimethylalkyl group bonded to a peroxy oxygen (ii) includes an amount within the range defined by the following formula:

$$(4.406X^2-0.592X+0.021)\leq Y\leq(0.726X^2-0.121X+0.009)$$

wherein X corresponds to the weight fraction of the di($C_6$-$C_{10}$ alkyl) peroxydicarbonate (i) and Y corresponds to the weight fraction of the organic peroxide having one peroxy, one peroxycarbonate, or one peroxybenzoate group and a 1,1-dimethylalkyl group bonded to a peroxy oxygen (ii);

(2) introducing the polymerizable composition into a mold cavity of a mold;

(3) introducing the mold into a preheated temperature controlled environment set at a temperature between 35° C. to 55° C.; and (4) subjecting the polymerizable composition within the mold cavity to a cure cycle to at least partially cure the polymerizable composition to form an at least partially cured optical article within the mold cavity, wherein the cure cycle comprises the following steps, in order:

(A) setting the temperature of the temperature controlled environment to a temperature selected between 45° C. to 55° C. and maintaining the temperature setting for 3 hours in a first cure cycle step, (B) increasing the temperature of the temperature controlled environment to 60±2° C. at a constant rate over a 7 hour period in a second cure cycle step, (C) increasing the temperature of the temperature controlled environment to 80±2° C. at a constant rate over a 5 hour period in a third cure cycle step, (D) increasing the temperature of the temperature controlled environment at a constant rate over a 1 hour period to reach a maximum temperature of 100° C. to 110° C. in a fourth cure cycle step, and (E) holding the polymerizable composition at the maximum temperature for at least 4 hours.

DESCRIPTION OF THE INVENTION

Figure 1:
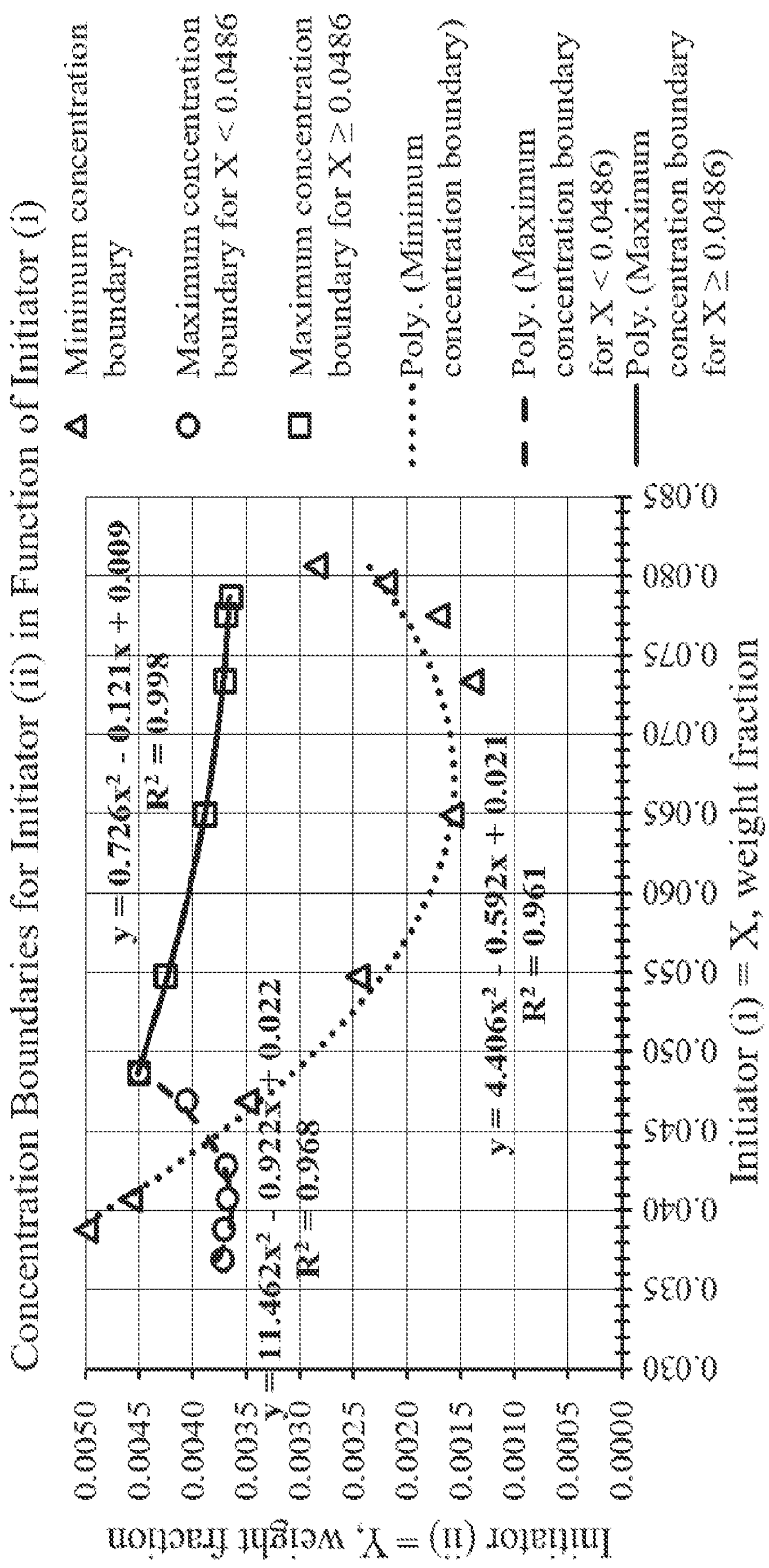
FIG. 1 is a graph depicting three quadratic regressions of the weight fraction of organic peroxide having one peroxy, one peroxycarbonate, or one peroxybenzoate group and a 1,1-dimethylalkyl group bonded to a peroxy oxygen (ii) as a function of the weight fraction of di($C_6$-$C_{10}$ alkyl) peroxydicarbonate (i) in polymerizable compositions.

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

As used in this specification and the appended claims, the phrase "and/or" when used in a list is meant to encompass alternative embodiments including each individual component in the list as well as any combination of components. For example, the list "A, B, and/or C" is intended to encompass seven separate embodiments that include A, or B, or C, or A+B, or A+C, or B+C, or A+B+C.

As used herein, the term "alkyl" means an aliphatic hydrocarbon group which may be linear or branched and comprising about 1 to about 20 carbon atoms in the chain. Non-limiting examples of suitable alkyl groups contain about 1 to about 18 carbon atoms in the chain, or about 1 to about 10 carbon atoms in the chain. Branched means that one or more lower alkyl groups such as, methyl, ethyl, propyl, or butyl are attached to a linear alkyl chain.

As used herein, "peroxy" is a group having the structure: —O—O—. As used herein, the "peroxycarbonate" is group having the structure:

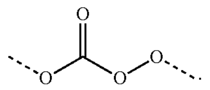

As used herein, "peroxybenzoate" is a group having the structure:

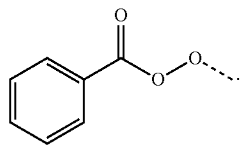

As used herein, "weight fraction" means the fraction of the weight of the cited component relative to the total solids weight of the components present in the polymerizable composition. The total solids weight of the polymerizable composition could include the weight of the polymerizable component (a), the polymerization initiator component (b), and any additional additives. For example, the weight fraction of the polymerizable component (a) would be the weight of the polymerizable component (a) divided by the total solids weight of the polymerizable composition and the weight fraction of the polymerization initiator component (b) would be the weight of the polymerization initiator component (b) divided by the total solids weight of the polymerizable composition.

As used herein, "a half-life of 10 hours" means that at a specified temperature, 10 hours is required for the initial concentration of polymerization initiator to decrease to half its initial value.

As used herein, the molecular weight is the formula weight, which is the sum of the atomic weights of all atoms present in a given chemical formula.

The various aspects and examples of the present invention as presented herein are each understood to be non-limiting with respect to the scope of the invention.

As previously mentioned, the present invention is directed to a polymerizable composition. The polymerizable composition comprises: (a) a polymerizable component comprising a diol bis(allyl carbonate) and/or a pre-polymer thereof; and (b) a polymerization initiator component. The polymerization initiator comprises: (i) a di($C_6$-$C_{10}$ alkyl) peroxydicarbonate, and (ii) an organic peroxide having one peroxy, one peroxycarbonate, or one peroxybenzoate group and a 1,1-dimethylalkyl group bonded to a peroxy oxygen. The organic peroxide having one peroxy, one peroxycarbonate or one peroxybenzoate group and a 1,1-dimethylalkyl group bonded to the peroxy oxygen comprises a molecular weight ranging from 200 to 250 g/mole. The polymerization initiator (b) is free of diisopropyl peroxydicarbonate. The di($C_6$-$C_{10}$ alkyl) peroxydicarbonate (i) comprises an amount ranging from 4.87% to 7.90% by weight relative to the total solids of the polymerizable composition. The organic peroxide having one peroxy, one peroxycarbonate, or one peroxybenzoate group and a 1,1-dimethylalkyl group bonded to a peroxy oxygen (ii) comprises an amount within the range defined by the following formula:

$$(4.406X^2-0.592X+0.021)\leq Y\leq(0.726X^2-0.121X+0.009)$$

where X corresponds to the weight fraction of the di($C_6$-$C_{10}$ alkyl) peroxydicarbonate (i) and Y corresponds to the weight fraction of the organic peroxide having one peroxy, one peroxycarbonate, or one peroxybenzoate group and a 1,1-dimethylalkyl group bonded to a peroxy oxygen (ii).

The polymerizable composition includes, but, is not limited to, those comprising at least one polymerizable component comprising a diol bis(allyl carbonate) and/or a prepolymer thereof (a). Non-limiting examples of suitable polymerizable components comprising a diol bis(allyl carbonate) and/or a prepolymer thereof can include ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), or combinations thereof. The diol bis(allyl carbonate) polymerizable component present in the polymerizable composition of the present invention can be diethylene glycol bis(allyl carbonate). Commercially available examples of diethylene glycol bis(allyl carbonate) monomers can include CR-39® monomer and HIGH ADC CR-39® monomer, Chemical Abstracts (CAS) No. 142-22-3, available from PPG Industries, Inc.

In addition to the polymerizable component comprising a diol bis(allyl carbonate) and/or prepolymer thereof (a), the polymerizable composition comprises a polymerization initiator component (b) that is capable of generating free radicals, i.e., a free-radical initiator, such as, organic peroxy compounds. The polymerization initiator component (b) of the present invention comprises: (i) a di($C_6$-$C_{10}$ alkyl) peroxydicarbonate, and (ii) an organic peroxide having one peroxy, one peroxycarbonate or one peroxybenzoate group and a 1,1-dimethylalkyl group bonded to a peroxy oxygen. In the present invention, the polymerization initiator component (b) is free of diisopropyl peroxydicarbonate. As used herein, the term "free of" means that there is no diisopropyl peroxydicarbonate intentionally added to the (b) polymerization initiator component. However, diisopropyl peroxydicarbonate may be present as an unintentional impurity, in an amount such as less than 0.1 wt. %, or such as less than 0.01 wt. %, in the (b) polymerization initiator component because of unavoidable contamination.

The di($C_6$-$C_{10}$ alkyl) peroxydicarbonate initiator (i) of the polymerization initiator component (b) can have a 10-hour half-life at a temperature of less than 55 degrees Celsius (° C.), such as, a 10-hour half-life at a temperature of less than 50° C., and can be considered a low activation temperature initiator. The di($C_6$-$C_{10}$ alkyl) peroxydicarbonate initiator (i) can be selected from the group consisting of di(2-ethylhexyl) peroxydicarbonate, di(n-hexyl) peroxydicarbonate, and mixtures thereof.

The organic peroxide having one peroxy, one peroxycarbonate, or one peroxybenzoate group and a 1,1-dimethylalkyl group bonded to a peroxy oxygen (ii) of the polymerization initiator component (b) can have a 10-hour half-life at a temperature of greater than or equal to 80° C. to less than or equal to 100° C. and can be considered a high activation temperature initiator.

The organic peroxide having one peroxy, one peroxycarbonate, or one peroxybenzoate group and a 1,1-dimethylalkyl group bonded to the peroxy oxygen (ii) has a molecular weight ranging from 200 to 250 grams per mole (g/mole). The 1,1-dimethylalkyl group of the organic peroxide having one peroxy, one peroxycarbonate, or one peroxybenzoate group and a 1,1-dimethylalkyl group bonded to a peroxy oxygen (ii) can comprise 1,1-dimethyl ethyl, 1,1-dimethyl propyl, or 1,1-dimethyl butyl.

The organic peroxide having one peroxy, one peroxycarbonate, or one peroxybenzoate group and the 1,1-dimethylalkyl group bonded to the peroxy oxygen (ii) can be selected from the group consisting of 1,1-dimethylpropyl 1-methoxycyclohexyl peroxide, tert-butylperoxy-2-ethylhexyl carbonate, tert-butylperoxy 2-ethylhexyl carbonate, tert-amyl peroxybenzoate, and mixtures thereof.

The graph of FIG. 1 shows quadratic regressions of the weight fraction of organic peroxide having one peroxy, one peroxycarbonate or one peroxybenzoate group and a 1,1-dimethylalkyl group bonded to a peroxy oxygen (ii) versus the weight fraction of di($C_6$-$C_{10}$ alkyl) peroxydicarbonate (i) in polymerizable compositions. The first quadratic regression is $Y=4.406X^2-0.592X+0.021$, the second quadratic regression is $Y=0.726X^2-0.121X+0.009$, and the third quadratic regression is $Y=11.462X^2-0.922X+0.022$.

Figure 2:
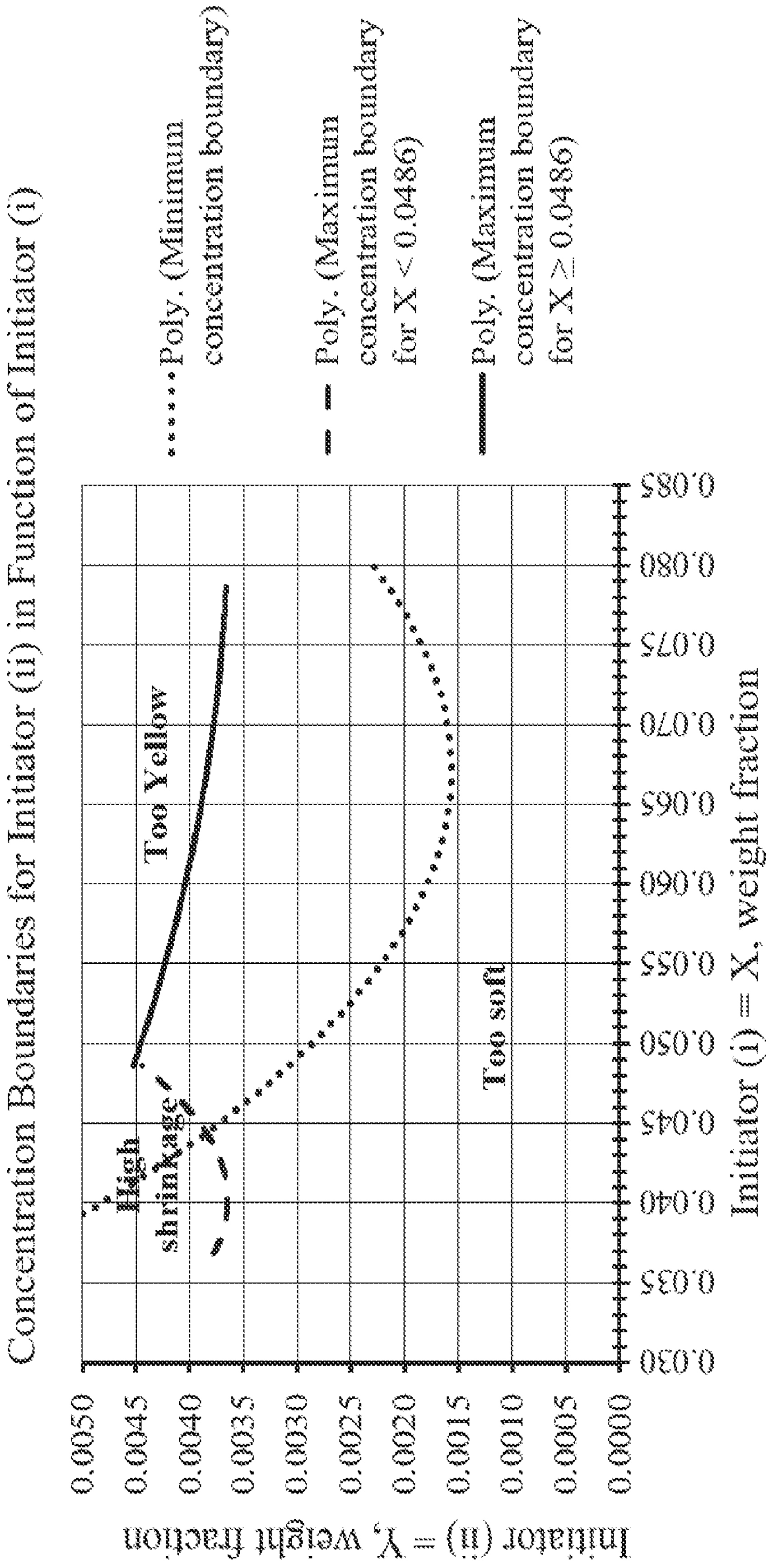
FIG. 2 is a graph depicting the three quadratic regressions of FIG. 1 with designations of where the hardness, shrinkage, and/or yellowness properties fall outside of acceptable ranges for optical articles.

Polymerizable compositions of the present invention which include a di($C_6$-$C_{10}$ alkyl) peroxydicarbonate (i) present in an amount ranging from 4.87% to 7.90% by weight, relative to the total solids of the polymerizable composition, and an organic peroxide having one peroxy, one peroxycarbonate, or one peroxybenzoate group and a 1,1-dimethylalkyl group bonded to a peroxy oxygen (ii) present in an amount defined by the following Equation 1:

$$(4.406X^2-0.592X+0.021)\leq Y\leq(0.726X^2-0.121X+0.009) \quad \text{Equation 1,}$$

where X corresponds to the weight fraction of (i) and Y corresponds to the weight fraction of (ii), when polymerized into optical articles, result in optical articles having an acceptable hardness, shrinkage, and yellowness. For example, the optical articles may have a hardness of greater than 84 Newtons per square millimeter ($N/mm^2$), shrinkage of less than or equal to 11.80%, and a yellowness of less than or equal to 0.8 units YIE. Optical articles formed from polymerizable compositions of the present invention having an amount of (i) that is outside of the 4.87% to 7.90% by weight range and/or an amount of (ii) that is outside of the following relationship of Equation 1:

$$(4.406X^2-0.592X+0.021)\leq Y\leq(0.726X^2-0.121X+0.009),$$

have hardness, shrinkage, and/or yellowness properties that fall outside of above-referenced acceptable ranges for optical articles, i.e., one or more of the desired properties may be outside of the acceptable value, as shown in FIG. 2. The test methods for determining the hardness, shrinkage, and yellowness properties of optical articles prepared from polymerizable compositions of the present invention are described in detail below in the Examples.

The polymerizable component comprising a diol bis(allyl carbonate) and/or a pre-polymer thereof (a) may be present in the polymerizable composition in an amount ranging from 91.2% to 94.9% by weight.

Various conventional additives may be included in the polymerizable composition, such as, light stabilizers, heat stabilizers, ultraviolet light absorbers, mold release agents, dyes, pigments, flexibilizing additive which are not radically polymerizable, e.g., alkoxylated phenol benzoates and poly (alkylene glycol) dibenzoates, antioxidants, e.g., hindered phenol antioxidants, and shelf-life stabilizers.

In the method of making a molded optical article of the present invention, the polymerizable composition as described above is prepared and then introduced into the mold cavity of a mold, for example, a glass mold. The mold can have a front portion and a back portion which are spaced apart from one another, thereby, defining a mold cavity there-between. Each of the front portion and the back portion of the mold have an exterior surface and an interior surface. The interior of the surface of the front portion and the interior surface of the back portion each independently may have a curvature of −10 to 10 diopters.

The polymerizable composition may be degassed prior to introducing the polymerizable composition into the mold cavity. For example, the polymerizable composition may be degassed under vacuum.

The polymerizable composition may then be sealed within the mold cavity using a sealing means. The sealing means can be comprised of any suitable material capable of holding together the front portion and the back portion of the mold. The sealing means should comprise materials compatible with the polymerizable composition components (i.e., the polymerizable component and the polymerization initiator component) and should be able to withstand processing temperatures as high as 130° C. Suitable sealing means can include, for example, a gasket, such as, a rubber gasket, and/or adhesive tape as are well-known in the art. Alternatively, the sealing means can include one or more clamps for securing the front portion and back portion of the mold filled with the polymerizable composition. Also, it should be understood that multiple sealing means can be used in combination to seal the polymerizable composition within the mold cavity.

The sealed mold containing the polymerizable composition is then placed into a preheated temperature controlled environment at a temperature between 35° C. to 55° C. As used herein, "temperature controlled environment" means an environment capable of holding a mold containing a polymerizable composition and having a means of controlling the temperature. Non-limiting examples of a temperature controlled environment include a cure oven, a water bath, and combinations thereof. The temperature controlled environment may be under an inert gas, such as, nitrogen or argon.

The polymerizable composition within the mold cavity is then subjected to a cure cycle sufficient to at least partially cure the polymerizable composition, thereby, forming an at least partially cured article within the mold cavity. As used herein, the phrase "at least partially cured" and like terms means that the polymerizable composition is subjected to conditions sufficient to polymerize the composition components slightly beyond the point at which the composition loses fluidity due to gelation (i.e., slightly beyond the gel point). The polymerizable composition comprises diol bis (allyl carbonate) and/or prepolymers thereof, where the point slightly beyond the gel point can be characterized as the point at which 10% to 50% allyl functional group conversion is achieved, such as, 10% to 40%, or 10% to 30%, such as, 15% to 50% or 15% to 40%, or 15% to 30%.

In a first cure cycle step, the temperature controlled environment is set to a temperature selected between 45° C. and 55° C. and the temperature setting is maintained for 3 hours ±10 minutes. In a second cure cycle step, the temperature of the temperature controlled environment is increased, at a constant rate, to 60° C.±2° C. over a 7 hour±10 minute period. In a third cure cycle step, the temperature of the temperature controlled environment is increased, at a constant rate, to 80±2° C. over a 5 hour±10 minute period. In a fourth cure cycle step, the temperature of the temperature controlled environment is increased, at a constant rate, over a 1 hour±10 minute period, to reach a maximum temperature of 100° C. to 110° C. The polymerizable composition in the mold is held at the maximum temperature of 100° C. to 110° C. for at least 4 hours. The temperature of the temperature controlled environment can then be lowered to less than or equal to 70° C. prior to removing the mold from the temperature controlled environment.

The polymerizable composition within the mold cavity can be preheated and cured in a cure oven for the entire cure cycle. The polymerizable composition within the mold cavity can be preheated and/or cured in a water bath and then transferred to a cure oven to complete the cure cycle. The polymerizable composition within the mold cavity can be preheated in a water bath and then transferred to a cure oven to complete the cure cycle. When the polymerizable composition within the mold cavity is removed from the water bath after the preheating step, the polymerizable composition within the mold cavity can rest for a time period of from 1 second to 5 hours at a temperature between 19° C. to 22 ° C. before being transferred to a cure oven to complete the remaining cure cycle steps. The polymerizable composition within the mold cavity can be preheated in a water bath, cured in the water bath in the first cure cycle step, and then transferred to a cure oven to complete the remaining cure cycle steps.

Following the removal of the mold from the temperature controlled environment, the at least partially cured optical article is removed from the mold cavity. The at least partially cured optical article can then be subjected to a further cure cycle sufficient to complete the polymerization of the polymerizable composition, thereby, forming a cured optical article. For example, the at least partially cured optical article can be placed in a temperature controlled environment and subjected to a temperature of 100° C. to 120° C. for at least 1 hour. As used herein, the phrases "complete polymerization" or "complete cure" is meant that the at least partially cured polymerizable composition is subjected to conditions that result in greater than 50% allylic group conversion (of allylic components of the composition), such as, greater than 60% allylic conversion, such as, greater than 70% allylic conversion, such as, greater than 80% allylic conversion, such as, greater than 90% allylic group conversion. Also, complete polymerization or complete cure can be characterized as greater than 50% up to and including 100% allylic group conversion, such as, greater than 50% up to and including 90% allylic conversion, such as, greater than 50% up to and including 85% allylic conversion, such as, greater than 50% up to and including 80% allylic conversion, such as, greater than 50% up to and including 75% allylic conversion.

One of ordinary skill in the art would understand that the cure temperature and cure time used to achieve at least partial cure of the polymerizable composition within the mold cavity and complete cure of the polymerization within the mold cavity, are dependent upon the (a) polymerizable component comprising a diol bis(allyl carbonate) and/or prepolymers thereof and (b) the polymerizable initiator component, which comprises the polymerizable composition.

A molded article can be prepared from the polymerizable composition as previously described. A molded optical article can be prepared using the method and the polymerizable composition as previously described.

As previously mentioned, the method of the present invention is particularly suitable for preparing molded optical articles, such as, optical lenses, shields and visors, windows, mirrors, liquid crystal cell elements, or devices, display elements, such as, screens, including both touch screens on devices, for example, cell phones, tablets, GPS, voting machines, point-of-sale devices or computer screens, display sheets in a picture frame, monitors, wearable displays, or security elements. Such articles may or may not include optical articles exhibiting one or more light influencing properties, such as, tint, photochromic, and/or polarization properties. The molded optical article may have a Fischer micro-hardness of greater than or equal to 84 $N/mm^2$ after complete polymerization.

The present invention is more particularly described in the following examples, which are intended as illustrative only since numerous modifications and variations therein will be apparent to those skilled in the art.

EXAMPLES

Part 1: Preparation of Polymerizable Compositions

Each of the following Formulations in Tables 1, 2 and 3, was prepared in a 250 milliliter (mL) beaker equipped with a magnetic stir bar. Each formulation was scaled to a total polymerizable composition mixture of approximately 100 grams (g).

For each formulation, the CR-39® component was mixed with an appropriate amount of a solution of 1% mold release agent in CR-39® to give a final concentration of mold release agent of 8 parts per million (ppm). This solution was stirred for 5 minutes at room temperature (23° C.), followed by addition of the first initiator listed in the Tables reading from left to right. This solution was stirred for 5 minutes, after which the di(2-ethylhexyl) peroxydicarbonate was added. The final solution was stirred for 10 minutes. The amounts listed in Tables 1-3 are weight fractions.

TABLE 1

Formulations used in Examples (values are in weight fraction).

| Formulation | CR-39 ® High ADC LV[1] | Tech-Lube ™ 113[2] | Luperox ® V10[3] | Luperox ® TBEC[4] | tert-Amyl peroxybenzoate | di(2-ethylhexyl) peroxydicarbonate |
|---|---|---|---|---|---|---|
| 1 | 0.9470 | $8 \times 10^{-6}$ | 0.0030 | — | — | 0.0500 |
| 2 | 0.9470 | $8 \times 10^{-6}$ | — | 0.0030 | — | 0.0500 |
| 3 | 0.9470 | $8 \times 10^{-6}$ | — | — | 0.0030 | 0.0500 |
| 4 | 0.9280 | $8 \times 10^{-6}$ | 0.0020 | — | — | 0.0700 |
| 5 | 0.9265 | $8 \times 10^{-6}$ | 0.0035 | — | — | 0.0700 |
| 6 | 0.9280 | $8 \times 10^{-6}$ | — | 0.0020 | — | 0.0700 |
| 7 | 0.9265 | $8 \times 10^{-6}$ | — | 0.0035 | — | 0.0700 |

[1]An allyl diglycol carbonate commercially available from PPG Industries, Inc. (Pittsburgh, PA).
[2]An internal mold release agent commercially available from Technik Products (South Plainfield, NJ).
[3]1,1-dimethyl propyl 1-methoxycyclohexylperoxide commercially available from Arkema (Colombes, France).
[4]OO-tert-butyl-O-(2-ethylhexyl)-monoperoxycarbonate commercially available from Arkema.

TABLE 2

Comparative Formulations (CF) with at least one component outside the defined parameters.

| Formulation | CR-39 ® High ADC LV | Tech-Lube ™ 113 | Luperox ® V10 | Luperox ® TBEC | tert-Amyl peroxybenzoate | di(2-ethylhexyl) peroxydicarbonate |
|---|---|---|---|---|---|---|
| CF-8 | 0.9500 | $8 \times 10^{-6}$ | — | — | — | 0.0500 |
| CF-9 | 0.9654 | $8 \times 10^{-6}$ | 0.0046 | — | — | 0.0300 |
| CF-10 | 0.9654 | $8 \times 10^{-6}$ | — | 0.0046 | — | 0.0300 |
| CF-11 | 0.9620 | $8 \times 10^{-6}$ | — | 0.0080 | — | 0.0300 |
| CF-12 | 0.9508 | $8 \times 10^{-6}$ | 0.0042 | — | — | 0.0450 |
| CF-13 | 0.9480 | $8 \times 10^{-6}$ | 0.0020 | — | — | 0.0500 |
| CF-14 | 0.9480 | $8 \times 10^{-6}$ | — | 0.0020 | — | 0.0500 |
| CF-15 | 0.9420 | $8 \times 10^{-6}$ | — | 0.0080 | — | 0.0500 |
| CF-16 | 0.9450 | $8 \times 10^{-6}$ | — | — | 0.0050 | 0.0500 |
| CF-17 | 0.9430 | $8 \times 10^{-6}$ | — | — | 0.0070 | 0.0500 |
| CF-18 | 0.9250 | $8 \times 10^{-6}$ | — | 0.0050 | | 0.0700 |

TABLE 3

Comparative Formulations (CF) with alternative secondary initiators.

| Formulation | CR-39 ® High ADC LV | Tech-Lube ™ 113 | tert-amyl peroxy-2-ethylhexanoate | tert-Butyl peroxy-3,5,5-trimethylhexanoate | di(2-ethylhexyl) peroxydicarbonate |
|---|---|---|---|---|---|
| CF-19 | 0.9470 | $8 \times 10^{-6}$ | 0.0030 | — | 0.0500 |
| CF-20 | 0.9470 | $8 \times 10^{-6}$ | — | 0.0030 | 0.0500 |

Part 2: General Casting Procedure

Prior to casting, each formulation was placed in a degassing chamber and degassed for a total of 10 minutes at a pressure of 60 millimeters of mercury (mmHg).

Sheet-forming mold cavities were built by assembling two 152 millimeter (mm) glass plates of 4.7 mm thickness, separating them evenly by a single piece of a silicone-based rubber round spline of 3.5 mm diameter and approximately 400 mm length that was placed at a distance of roughly 13 mm from the edge of the glass plates, forming a semi-square between them. The glass plates and spline were firmly held together using multiple binder clips clamped around the perimeter of the glass.

The polymerizable compositions described above were cast into the sheet-forming mold cavities by transferring a total of approximately 50 g of the formulation using a 60 mL plastic syringe.

Part 3: Curing of the Polymerizable Compositions

For each of the Examples and Comparative Examples, the casted sheet-forming mold cavities were placed inside a programmable air convection oven that was pre-set at a temperature of 35° C. The casted mold cavities were then subjected to either Cure Cycle A or Cure Cycle B described below in Table 4. The cure cycles used for each Example and Comparative Example is provided in Tables 5-9 in the Results section below.

TABLE 4

Cure programs used for Examples and Comparative Examples

| Program step | Cure Cycle A | Cure Cycle B |
|---|---|---|
| 1 | Hold at 55° C. for 3 hours | Hold at 45° C. for 3 hours |
| 2 | Ramp from 55° C. to 60° C. in 7 hours at a constant rate. | Ramp from 45° C. to 60° C. in 7 hours at a constant rate. |
| 3 | Ramp from 60° C. to 80° C. in 5 hours at a constant rate. | Ramp from 60° C. to 80° C. in 5 hours at a constant rate. |
| 4 | Ramp from 80° C. to 110° C. in 1 hour at a constant rate. | Ramp from 80° C. to 110° C. in 1 hour at a constant rate. |
| 5 | Hold at 110° C. for 5 hours. | Hold at 110° C. for 5 hours. |
| 6 | Ramp from 110° C. to 70° C. in 1 hour at a constant rate. | Ramp from 110° C. to 70° C. in 1 hour at a constant rate. |

Part 4: Demolding and Post-Curing of the Polymer Sheets

For each of the Examples and Comparative Examples, after the cure program was finished, the mold cavities containing the polymer sheets were extracted from the oven one at a time, followed by the removal of the binder clips and rubber spline. Utilizing a plastic wedge and a hammer, the glass plates were separated from the polymer sheet.

The polymer sheets were then placed inside of an air convection oven over glass plates. The temperature of the oven was set to 100° C. and the temperature of the polymer sheets was monitored by means of a thermocouple embedded in a previously prepared polymer piece made from the same monomer composition. Once the temperature of the polymer sheet reached 100° C., a total post cure time of 60 minutes at constant temperature was allowed, followed by cool down until equilibrated with the room temperature.

Part 5: Determination of Properties

For each of the Examples and Comparative Examples, the following properties were measured and tabulated in Tables 5-9.

5A: Polymerization Shrinkage

The amount of polymerization shrinkage was calculated according to Equation 2 shown below, using the uncured formulation density and cured polymer density, both measured at 25° C.:

$$\% \text{ Shrinkage}=[(\text{cured polymer density}-\text{uncured formulation density})/\text{cured polymer density}]\times 100\% \quad \text{Equation 2:}$$

5B. Fischer Microhardness

The Fischer microhardness (FMH) was determined by testing according to ISO 14577-07 using a FISCHERSCOPE® H-100SMC (available from Fischer Technology, Inc.). The FMH of polymerizates was measured at a load of 300 milliNewton (mN), following a load application of 0-300 mN in 15 seconds. The results are an arithmetic average of 5 measurements.

5C. Yellowness Index E313

Polymer yellowness index (YI) was measured according to ASTM E313-10 using a Hunterlab Ultrascan PRO (available from Hunter Associates Laboratory, Inc.). The path length for the samples was equal to the sample thickness. The values reported were obtained at Illuminant D65 and observer angle of 10 degrees. An acceptable polymer for purposes of the present invention had the following three attributes: (1) a Fischer microhardness (FMH) of greater than 84 $N/mm^2$; (2) a Yellowness index (YI) less than or equal to 0.8 units YIE; and (3) Polymerization Shrinkage less than or equal to 11.80%.

Part 6: Results

TABLE 5

Examples with 5.00% peroxydicarbonate initiator.

| Example | Formulation | Initiator (ii), weight fraction | Cure cycle | FMH, N/mm$^2$ | Yellowness Index E313 | Shrinkage |
|---|---|---|---|---|---|---|
| 1 | 1 | 0.0030 | A | 86 | 0.4 | 11.57% |
| 2 | 2 | 0.0030 | A | 90 | 0.7 | 11.70% |
| 3 | 3 | 0.0030 | A | 93 | 0.8 | 11.70% |
| 4 | 2 | 0.0030 | B | 88 | 0.7 | 11.50% |
| CE-5 | CF-8 | 0.0 | A | 60 | 0.4 | 11.09% |
| CE-6 | CF-13 | 0.0020 | A | 77 | 0.4 | 11.57% |
| CE-7 | CF-14 | 0.0020 | A | 82 | 0.6 | 11.57% |

According to Equation 1, the allowable weight fraction range for initiator (ii) is between 0.0024 and 0.0048. As shown in Table 5, when the initiator (ii) is absent (CE-5) or present at an amount lower than prescribed, the resulting polymer has a Fisher microhardness lower than acceptable (i.e., the resulting polymer is too soft).

TABLE 6

Examples with 5.00% peroxydicarbonate vs. Comparative Examples with initiator (ii) levels higher than prescribed

| Example | Formulation | Initiator (ii), weight fraction | Cure cycle | FMH, N/mm$^2$ | Yellowness Index E313 | Shrinkage |
|---|---|---|---|---|---|---|
| 1 | 1 | 0.0030 | A | 86 | 0.4 | 11.57% |
| 2 | 2 | 0.0030 | A | 90 | 0.7 | 11.70% |
| 3 | 3 | 0.0030 | A | 93 | 0.8 | 11.70% |
| 4 | 2 | 0.0030 | B | 88 | 0.7 | 11.50% |
| CE-8 | CF-15 | 0.0080 | A | 97 | 1.2 | 11.70% |
| CE-9 | CF-16 | 0.0050 | A | 97 | 1.0 | 11.82% |
| CE-10 | CF-17 | 0.0070 | A | 100 | 1.1 | 11.85% |

According to Equation 1, when the peroxydicarbonate initiator is 5.00%, the allowable weight fraction range for initiator (ii) is between 0.0024 and 0.0048. The results shown in Table 6 demonstrate that when the initiator (ii) level is higher than prescribed by Equation 1, the resulting polymer has unacceptably high yellowness index, and in some cases unacceptable shrinkage as well.

TABLE 7

Examples with 7.00% peroxydicarbonate initiator

| Example | Formulation | Initiator (ii), weight fraction | Cure cycle | FMH, N/mm$^2$ | Yellowness Index E313 | Shrinkage |
|---|---|---|---|---|---|---|
| 11 | 4 | 0.0020 | A | 87 | 0.5 | 11.27% |
| 12 | 5 | 0.0035 | A | 89 | 0.5 | 11.27% |
| 13 | 6 | 0.0020 | A | 89 | 0.6 | 11.34% |
| 14 | 7 | 0.0035 | A | 91 | 0.8 | 11.27% |
| CE-15 | CF-18 | 0.0050 | A | 93 | 0.9 | 11.27% |

According to Equation 1, when the peroxydicarbonate initiator is 7.00%, the allowable weight fraction range for initiator (ii) is between 0.0015 and 0.0038. The results in Table 7 demonstrate that when the peroxycarbonate level is 7.00% and the initiator (ii) level is within the prescribed range, an acceptable polymer is formed. However, if the initiator (ii) level is higher than prescribed as in CE-8, the yellowness index is unacceptable.

TABLE 8

Comparison of peroxybenzoate as initiator (ii) vs. non-benzoate peroxyesters.

| Example | Formulation | Cure cycle | FMH, N/mm$^2$ | Yellowness Index E313 | Shrinkage |
|---|---|---|---|---|---|
| 3 | 3 | A | 93 | 0.8 | 11.70% |
| CE-16 | CF-19 | A | 76 | 0.4 | 11.55% |
| CE-17 | CF-20 | A | 75 | 0.4 | 11.69% |

The results in Table 8 demonstrate that saturated peroxyesters do not provide the necessary hardness as compared to a peroxybenzoate initiator (ii).

TABLE 9

Comparative Examples that used a concentration of di(2-ethylhexyl) peroxydicarbonate outside of the claimed range

| Comparative example | Formulation | Peroxy-dicarbonate concentration | Cure cycle | FMH, N/mm$^2$ | Yellowness Index E313 | Shrinkage |
|---|---|---|---|---|---|---|
| CE-18 | CF-9 | 3.00% | A | 67 | 0.3 | 11.58% |
| CE-19 | CF-10 | 3.00% | A | 85 | 0.7 | 11.85% |
| CE-20 | CF-11 | 3.00% | A | 95 | 1.0 | 11.85% |
| CE-21 | CF-12 | 4.50% | A | 88 | 0.5 | 11.82% |

The results in Table 9 demonstrate that when an insufficient peroxydicarbonate initiator is present, either the hardness, shrinkage, yellowness index, or a combination of these properties are not satisfactory regardless of the concentration of initiator (ii).

While specific embodiments of the present invention have been described in detail, it will be appreciated by those skilled in the art that various modifications and alternatives to those details could be developed in light of the overall teachings of the disclosure. Accordingly, the particular embodiments disclosed herein are intended to be illustrative only and not limiting as to the scope of the invention, which is to be given the full breadth of the claims appended and any and all equivalents thereof.

The invention claimed is:

1. A polymerizable composition comprising:

(a) a polymerizable component comprising a diol bis (allyl carbonate) and/or a pre-polymer thereof; and (b) a polymerization initiator component comprising:

(i) a di($C_6$-$C_{10}$ alkyl) peroxydicarbonate, and (ii) an organic peroxide having one peroxy, one peroxycarbonate, or one peroxybenzoate group and a 1,1-dimethylalkyl group bonded to a peroxy oxygen, wherein the organic peroxide having one peroxy, one peroxycarbonate, or one peroxybenzoate group and a 1,1-dimethylalkyl group bonded to the peroxy oxygen comprises a molecular weight ranging from 200 to 250 g/mole, wherein the polymerization initiator (b) is free of diisopropyl peroxydicarbonate, wherein the di($C_6$-$C_{10}$ alkyl) peroxydicarbonate (i) comprises an amount ranging from 4.87% to 7.90% by weight relative to the total solids of the polymerizable composition, and wherein the organic peroxide having one peroxy, one peroxycarbonate, or one peroxybenzoate group and a 1,1-dimethylalkyl group bonded to a peroxy oxygen (ii) comprises an amount within the range defined by the following formula:

$$(4.406X^2 - 0.592X + 0.021) \leq Y \leq (0.726X^2 - 0.121X + 0.009)$$

wherein X corresponds to the weight fraction of the di ($C_6$-$C_{10}$ alkyl) peroxydicarbonate (i) and Y corresponds to the weight fraction of the organic peroxide having one peroxy, one peroxycarbonate, or one peroxybenzoate group and a 1,1-dimethylalkyl group bonded to a peroxy oxygen (ii).

2. The polymerizable composition of claim 1, wherein the diol bis(allyl carbonate) and/or the prepolymer thereof comprises ethylene glycol bis(2-chloroallyl carbonate), ethylene glycol bis(allyl carbonate), diethylene glycol bis(2-methylallyl carbonate), diethylene glycol bis (allyl carbonate), triethylene glycol bis (allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), or combinations thereof.

3. The polymerizable composition of claim 1, wherein the diol bis(allyl carbonate) comprises diethylene glycol bis (allyl carbonate).

4. The polymerizable composition of claim 1, wherein the di($C_6$-$C_{10}$ alkyl) peroxydicarbonate (i) comprises a half-life of 10 hours at a temperature of less than 55° C.

5. The polymerizable composition of claim1, wherein the di($C_6$-$C_{10}$ alkyl) peroxydicarbonate (i) is selected from the group consisting of di(2-ethylhexyl) peroxydicarbonate, di(n-hexyl) peroxydicarbonate, and mixtures thereof.

6. The polymerizable composition of claims 1, wherein the organic peroxide having one peroxy, one peroxycarbonate, or one peroxybenzoate group and the 1,1-dimethylalkyl group bonded to the peroxy oxygen (ii) comprises a half-life of 10 hours at a temperature of greater than or equal to 80° C. to less than or equal to 100° C.

7. The polymerizable composition of claims 1, wherein the 1,1-dimethyalkyl group comprises 1,1-dimethyl ethyl, 1,1-dimethyl propyl, or 1,1-dimethyl butyl.

8. The polymerizable composition of claims 1, wherein the organic peroxide having one peroxy, one peroxycarbonate, or one peroxybenzoate group and the 1,1-dimethylalkyl group bonded to the peroxy oxygen (ii) is selected from the group consisting of 1,1-dimethylpropyl 1-methoxycyclohexyl peroxide, tert-butylperoxy-2-ethylhexyl carbonate, tert-butylperoxy 2-ethylhexyl carbonate, tert-amyl peroxybenzoate, and mixtures thereof.

9. A method of preparing a molded optical article, the method comprising:
(1) providing a polymerizable composition,
wherein preparation of the polymerizable composition comprises mixing (a) a polymerizable component comprising a diol bis (allyl carbonate) and/or a pre-polymer thereof with (b) a polymerization initiator component, wherein (b) the a polymerization initiator component comprises:
(i) a di($C_6$-$C_{10}$ alkyl) peroxydicarbonate, and
(ii) an organic peroxide having one peroxy, one peroxycarbonate, or one peroxybenzoate group and a 1,1-dimethylalkyl group bonded to a peroxy oxygen,
wherein the organic peroxide having one peroxy, one peroxycarbonate, or one peroxybenzoate group and a 1,1-dimethylalkyl group bonded to the peroxy oxygen comprises a molecular weight ranging from 200 to 250 g/mole,
wherein the polymerization initiator (b) is free of diisopropyl peroxydicarbonate,
wherein the di($C_6$-$C_{10}$ alkyl) peroxydicarbonate (i) comprises amount ranging from 4.87% to 7.90% by weight relative to the total solids of the polymerizable composition, and
wherein the organic peroxide having one peroxy, one peroxycarbonate, or one peroxybenzoate group and a 1,1-dimethylalkyl group bonded to a peroxy oxygen (ii) comprises an amount within the range defined by the following formula:

$$(4.406X^2-0.592X+0.021)\leq Y\leq(0.726X^2-0.121X+0.009)$$

wherein X corresponds to the weight fraction of the di($C_6$-$C_{10}$ alkyl) peroxydicarbonate (i) and Y corresponds to the weight fraction of the organic peroxide having one peroxy, one peroxycarbonate, or one peroxybenzoate group and a 1,1-dimethylalkyl group bonded to a peroxy oxygen (ii);
(2) introducing the polymerizable composition into a mold cavity of a mold;
(3) introducing the mold into a preheated temperature controlled environment set at a temperature between 35° C. to 55° C.; and
(4) subjecting the polymerizable composition within the mold cavity to a cure cycle to at least partially cure the polymerizable composition to form an at least partially cured optical article within the mold cavity,
wherein the cure cycle comprises the following steps, in order:
(A) setting the temperature of the temperature controlled environment to a temperature selected between 45° C. to 55° C. and maintaining the temperature setting for 3 hours in a first cure cycle step,
(B) increasing the temperature of the temperature controlled environment to 60±2° C. at a constant rate over a 7 hour period in a second cure cycle step,
(C) increasing the temperature of the temperature controlled environment to 80±2° C. at a constant rate over a 5 hour period in a third cure cycle step,
(D) increasing the temperature of the temperature controlled environment at a constant rate over a 1 hour period to reach a maximum temperature of 100° C. to 110° C. in a fourth cure cycle step, and
(E) holding the polymerizable composition at the maximum temperature for at least 4 hours.

10. The method of claim 9, further comprising degassing the polymerizable composition prior to (2) introducing the polymerizable composition into the mold cavity of the mold.

11. The method of claim 9, wherein the mold is sealed prior to (3) introducing the mold into the temperature controlled environment.

12. The method of claims 9, wherein after step (4)(E) the mold is removed from the temperature controlled environment and the at least partially cured optical article is removed from the mold cavity.

13. The method of claim 9, wherein the temperature of the temperature controlled environment is lowered to 70° C. prior to removing the mold from the temperature controlled environment.

14. The method of claim 9, wherein the at least partially cured optical article is subjected to a temperature of 100° C. to 120° C. for at least 1 hour after being removed from the mold.

15. The method of claim 9, wherein the molded optical article is selected from the group consisting of optical lenses, shields and visors, windows, mirrors, liquid crystal cell elements, display elements, and security elements.

16. The method of claim 9, wherein the molded optical article is a lens.

17. The method of claim 9, wherein the molded optical article comprises a Fischer micro-hardness of ≥84 $N/mm^2$.

* * * * *